(12) United States Patent
Krantz

(10) Patent No.: US 8,295,971 B2
(45) Date of Patent: Oct. 23, 2012

(54) COMPUTER ASSISTED DETERMINATION OF TAPPED THREADS FROM CAD FILE

(75) Inventor: Donald G. Krantz, Eden Prairie, MN (US)

(73) Assignee: Proto Labs, Inc., Maple Plain, MN (US)

( * ) Notice: Subject to any disclaimer, the term of this patent is extended or adjusted under 35 U.S.C. 154(b) by 516 days.

(21) Appl. No.: 12/553,088

(22) Filed: Sep. 2, 2009

(65) Prior Publication Data

US 2011/0054655 A1 Mar. 3, 2011

(51) Int. Cl.
G06F 19/00 (2011.01)
(52) U.S. Cl. .......... 700/182; 700/98; 700/197; 345/419; 345/420; 703/2
(58) Field of Classification Search ............. 700/98, 700/182, 197, 200; 703/2; 345/419, 420
See application file for complete search history.

(56) References Cited

U.S. PATENT DOCUMENTS

| | | | |
|---|---|---|---|
| 4,521,860 A | 6/1985 | Kanematsu et al. | |
| 5,033,014 A | 7/1991 | Carver et al. | |
| 5,289,382 A | 2/1994 | Goto | |
| 5,815,400 A | 9/1998 | Hirai et al. | |
| 6,110,213 A | 8/2000 | Vinciarelli et al. | |
| 6,327,553 B1 * | 12/2001 | Nishiyama et al. | 703/2 |
| 6,400,998 B1 | 6/2002 | Yamazaki et al. | |
| 6,408,217 B1 | 6/2002 | Nishiyama et al. | |
| 6,618,643 B2 | 9/2003 | Nishiyama et al. | |
| 6,671,572 B1 | 12/2003 | Craft et al. | |
| 6,701,200 B1 | 3/2004 | Lukis et al. | |
| 6,836,699 B2 | 12/2004 | Lukis et al. | |
| 6,950,826 B1 * | 9/2005 | Freeman | 1/1 |
| 7,058,472 B2 | 6/2006 | Mathews et al. | |
| 7,089,082 B1 | 8/2006 | Lukis et al. | |
| 7,123,986 B2 | 10/2006 | Lukis et al. | |
| 7,299,101 B2 | 11/2007 | Lukis et al. | |
| 7,349,757 B2 * | 3/2008 | Tanaka et al. | 700/186 |
| 7,492,364 B2 * | 2/2009 | Devarajan et al. | 345/420 |
| 7,496,528 B2 | 2/2009 | Lukis et al. | |
| 7,574,339 B2 | 8/2009 | Lukis et al. | |
| 7,801,770 B2 * | 9/2010 | Nelson | 705/26.1 |
| 7,957,830 B2 * | 6/2011 | Lukis et al. | 700/160 |
| 2004/0153296 A1 * | 8/2004 | Landers et al. | 703/2 |
| 2005/0096780 A1 | 5/2005 | Lukis et al. | |
| 2006/0173566 A1 | 8/2006 | Walls-Manning et al. | |
| 2007/0038531 A1 | 2/2007 | Lukis et al. | |
| 2007/0206030 A1 | 9/2007 | Lukis | |
| 2008/0120823 A1 | 5/2008 | Lukis et al. | |
| 2009/0104585 A1 * | 4/2009 | Diangelo et al. | 433/223 |
| 2009/0125418 A1 | 5/2009 | Lukis et al. | |
| 2009/0325125 A1 * | 12/2009 | DiAngelo et al. | 433/173 |

* cited by examiner

*Primary Examiner* — John R. Cottingham
*Assistant Examiner* — Douglas Lee
(74) *Attorney, Agent, or Firm* — Shewchuk IP Services, LLC; Jeffrey D. Shewchuk

(57) ABSTRACT

A computer program, system and method receives a customer's CAD file of a custom part to be formed. Depending upon customer responses to several basic queries, the CAD file is analyzed to identify acceptable holes for tapping. For each identified hole, an appropriate and available thread size is automatically selected, even if the cylindrical recess differs in size from the characteristic size of the threaded hole. The customer is then automatically advised 10 of the results of the tapping analysis, preferably as part of a quotation for part manufacture that identifies the number of threaded holes in the part and preferably identifies the changes to the tapped holes and the specific thread form being quoted for the hole.

20 Claims, 6 Drawing Sheets

COMPUTER ASSISTED DETERMINATION OF TAPPED THREADS FROM CAD FILE

CROSS-REFERENCE TO RELATED APPLICATION(S)

None.

BACKGROUND OF THE INVENTION

The present invention relates to the field of custom part making, and particularly to automated or computer assisted communication and manufacture regarding custom parts. More specifically, the present invention relates to software supported methods, systems and tools used in the design and fabrication of custom parts to be formed with tapped holes for receiving a threaded fastener, and in presenting information to customers for the customer to have selective computer-assisted smart input into the design and quotation of parts with tapped holes.

As in many other areas of industry, various computer advances have been applied to custom part manufacturing. Today, most part designers do not prepare part drawings by hand, but rather prepare part drawings through commercially available programs referred to as CAD (Computer-Aided Design) software. Also, in many situations, machining operations are not manually controlled. Instead, CNC (Computer Numerical Control) machines such as vertical mills are used to manufacture parts, molds and/or EDM electrodes in accordance with a set of CNC instructions. To compute detailed toolpaths for the tools assigned by the moldmaker or machinist and to produce long sequences of such instructions for CNC mills, CAM (Computer-Aided Manufacturing) software can be used. CAD/CAM software packages are built around geometry kernels—computationally intensive software implementing numerical algorithms to solve a broad set of mathematical problems associated with analysis of geometrical and topological properties of three-dimensional (3D) objects, such as faces and edges of 3D bodies, as well as with generation of new, derivative 3D objects. At present, a number of mature and powerful geometry kernels are commercially available.

In recent years, computer-based communications regarding custom parts has become more and more commonplace. Often part designers do not even meet face-to-face with the machinist or company that will manufacture a custom part. Instead communications occur over the internet, including transmission from the part designer of a CAD file representing the design of the part, and a computer-based quotation from the manufacturer of the cost of custom manufacturing of the part. Examples of such computer-based communication and quotations systems are those provided by Proto Labs, Inc. and detailed in the following patents and patent applications owned by Proto Labs, Inc. and all incorporated by reference:

U.S. Pat. No. 6,701,200, entitled Automated Custom Mold Manufacture;
U.S. Pat. No. 6,836,699, entitled Automated Quoting of Molds and Molded Parts;
U.S. Pat. No. 7,089,082, entitled Automated Multi-Customer Molding
U.S. Pat. No. 7,123,986, entitled Family Molding;
U.S. Pat. No. 7,299,101, entitled Manipulatable Model For Communicating Manufacturing Issues Of A Custom Part;
U.S. Pat. No. 7,496,528, entitled Automated Quoting of Molds and Molded Parts;
U.S. Pat. No. 7,574,339, entitled Automated Generation Of Lean Models For Injection Molding Simulation;
U.S. patent application Ser. No. 10/970,130, entitled Automated Quoting of Molds and Molded Parts;
U.S. patent application Ser. No. 11/338,052, entitled Communicating Mold/Part Manufacturability Issues;
U.S. patent application Ser. No. 11/368,590, entitled Graphical User Interface For Three-Dimensional Manipulation Of A Part;
U.S. patent application Ser. No. 11/586,223, entitled Automated Total Profile Machining of Parts;
U.S. patent application Ser. No. 11/586,379, entitled Automated Quoting Of CNC Machined Custom Molds And/Or Custom Parts;
U.S. patent application Ser. No. 12/136,552, entitled CNC Instructions For Solidification Fixturing Of Parts; and
U.S. patent application Ser. No. 12/354,546, entitled Automated Quoting of Molds and Molded Parts.

These computer-based improvements have collectively both streamlined and added flexibility to the custom part design/quotation/manufacture process.

At the same time as all these computer advances, however, part designers commonly have less and less engineering knowledge and experience. When custom parts interact with the real world, real world constraints and standards may or may not be known to the part designer.

One increasingly prevalent example occurs when a custom part is intended to be assembled with or otherwise mate with a threaded fastener. While the part designer may desire a custom part, the part designer may have no desire or purpose for using a custom threaded fastener. Instead, the part designer may want to use the most inexpensive fastener that will work for the attachment function. Standards have been developed and published for threaded fasteners, including ANSI/English (American National Standards Institute) and ISO/metric (International Organization for Standardization) classifications. See ANSI/ASME standards B1.1, B1.10M, B1.13M and B1.15 and ISO standards 68-1, 68-2,261, 262 and 965 et seq. These standards detail hundreds or thousands of different thread sizes, fit and tolerance values.

These standards are unknown to many part designers, and are not well understood by other part designers who are aware of the standards. Further, some of the standards define more common fasteners, while other standards define less common fasteners, and most part designers have no easy reference to discern which is which. In some cases, a part designer who simply desires a tapped hole for a "common" screw size may unintentionally specify an uncommon screw size or tap. The unintentional uncommon specification may occur either in detailed CAD drawings for the screw threads of the tapped hole, or through specifying an uncommon standard. In many more cases, the part designer may not specify any tap or screw size, and instead perform the drilling and/or tapping operation separately after the custom-designed part has been delivered by the manufacturer. In other words, often times the difficulty in identifying and communicating the desired screw thread parameters over the internet leads many part designers to adopt an "We'll just take care of that aspect later by ourselves" approach.

Even if the designer knows how to specify a desired thread size, there is no standard way to annotate 3D-CAD drawings with thread information. Several of the common 3D-CAD packages don't even have a non-standard way to add thread annotations or meta-data.

Even if the thread size is properly specified, the part designer may not know which size pilot hole to use for the tap. Various published references provide different recommendations for pilot hole sizes, and the part designer may not know which size to use. For instance, for tapping a #2-56 UNC 2B ANSI thread, different references might recommend either a #49, a #50, or a #51 pilot hole. The recommended pilot hole size may also depend upon the amount of thread forming performed by the particular tap, which is not commonly known by the part designer. The recommended pilot hole size may also depend upon the depth of the threaded portion of the hole, using relationships not commonly known to the part designer.

Many part designers do not have the time or inclination to become experts in screw threads. Better systems, which are simpler from the customer's perspective, need to be developed.

BRIEF SUMMARY OF THE INVENTION

The present invention is a computer program, system and method that proposes modifications to a customer's part to correspond to common tap sizes of threaded holes that mate with commonly available threaded fasteners. Depending upon customer responses to several basic queries, the customer's CAD file of a part to be formed is analyzed to determine whether one or more qualifying cylindrical recesses are included in the shape. For each identified qualifying cylindrical recess, one appropriate and available thread size is automatically selected, even if the cylindrical recess differs in size from the characteristic size of the threaded hole as specified in the CAD file. The customer is then automatically advised of the results of the tapping analysis, preferably as part of a quotation for part manufacture that identifies the number of threaded holes in the part and optionally specifies which thread profile has been assigned.

While the above-identified drawing figures set forth one or more preferred embodiments, other embodiments of the present invention are also contemplated, some of which are noted in the discussion. In all cases, this disclosure presents the illustrated embodiments of the present invention by way of representation and not limitation. Numerous other minor modifications and embodiments can be devised by those skilled in the art that fall within the scope and spirit of the principles of this invention.

DETAILED DESCRIPTION

Figure 1:
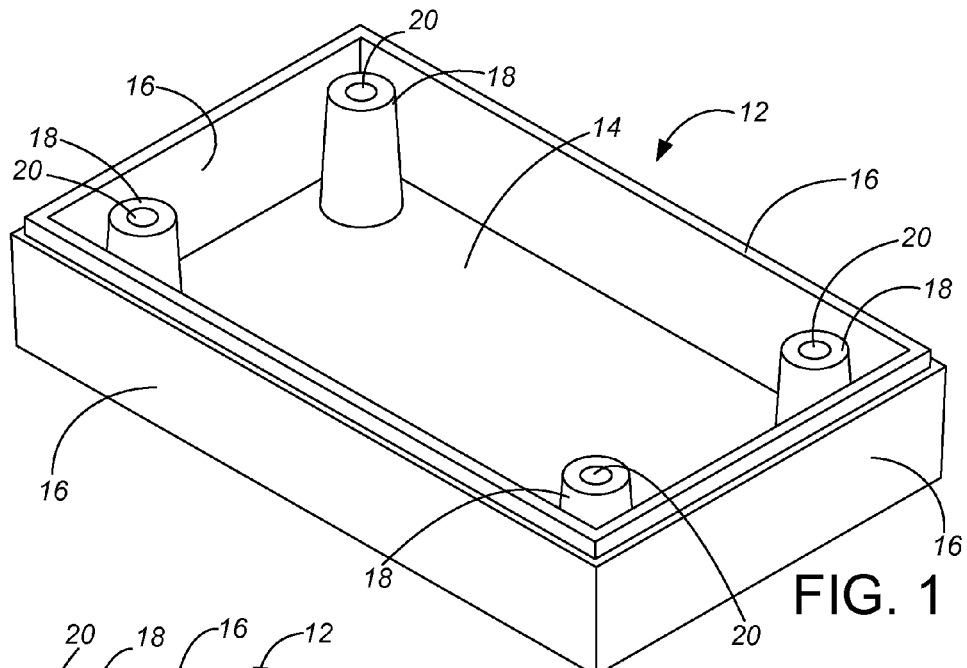
FIG. 1 is a perspective view of an example of a CAD drawn custom part with holes intended to receive threaded fasteners.
Figure 2:
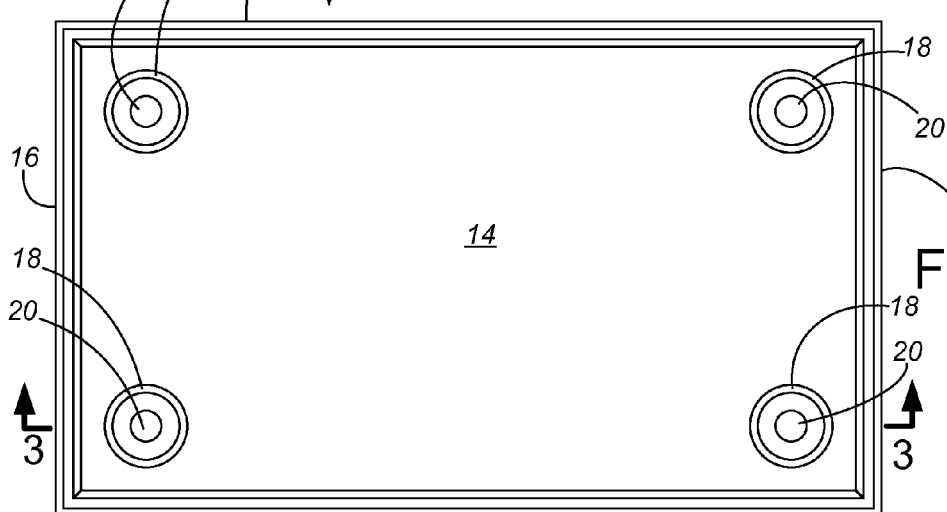
FIG. 2 is a front view of the part of FIG. 1.
Figure 3:
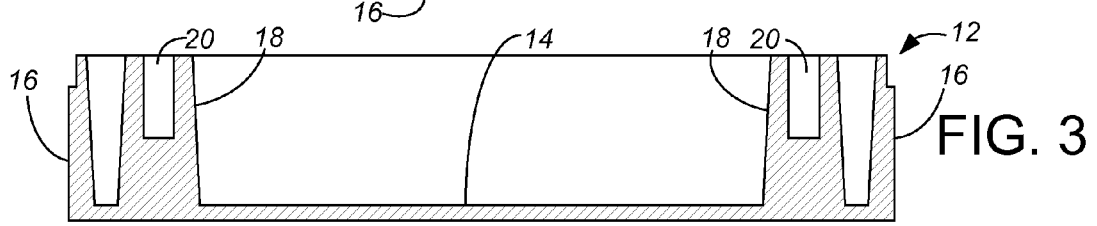
FIG. 3 is a cross-sectional view of the part of FIGS. 1 and 2, taken along lines 3-3.

The present invention is intended to be used in quoting custom parts, i.e., parts having a shape that is specially drawn by the customer and unknown to the part manufacturer/supplier at the time the manufacturer/supplier designs the software system for analyzing, quoting and/or producing the part. For example, in designing a part and seeking a manufacturing supply for one or more of such parts, a customer has prepared a 3D CAD drawing file 10 (shown in FIG. 4) of the part 12 shown in FIGS. 1 through 3. The CAD file 10 generally defines the shape of the customer's part 12 to be formed.

The particular type of 3D CAD software drawing file format used by the customer is not central to the present invention. For instance, common commercially available 3D CAD software programs include AUTOCAD, SOLIDWORKS, PRO/ENGINEER, UNIGRAPHICS, AUTODESK INVENTOR, PARASOLID, I-DEAS, STEP, IGES, ACIS, TURBOCAD, EDRAWINGS and VISI-CAD. There are several standard exchange formats currently used in the 3D CAD industry. Presently the most widely used format is the Initial Graphics Exchange Specification (IGES) standard. The preferred embodiment of the present invention accepts IGES (.igs), STEP (.stp), SolidWorks (.sldprt), ProE (.prt), Parasolid (.x_t or .x_b), AutoCAD (.dwg and .ipt) and ACIS (.sat) file formats, and may be extended to include various other (.stl, .dwf, etc.) drawing file formats so as to be compatible with all the commercial CAD products currently in use. Alternatively, certain CAD file types might be prohibited for use in quoting and purchasing parts with tapped holes, such as stereolithography (.stl) files that represent the part surface profile as a series of triangles, and therefore do not have a coding mechanism for easily identifying the defined diameter of a cylindrical recess.

The example part 12 is, in this case, a rectangular rear enclosure having a back wall 14 and four side walls 16. A front cover (not shown) is a separate part that the designer intends to mate with the rear enclosure 12. The rear enclosure 12 includes four bosses 18 extending forward from the back wall 14. Each boss 18 includes a cylindrical recess 20 intended as a screw hole. The designer intends each screw hole 20 to receive a screw (not shown), so the cover can be secured to the rear enclosure 12 with four screws or bolts. However, none of these features are named or identified in the CAD file 10, but rather merely represented as shapes of a surface profile of the part 12. In this case, the bosses 18 and the side walls 16 are all drafted so the part can be formed by injection molding or casting if later used in production, but the part designer is at present only interested in obtaining one or several parts of this shape for prototyping.

While some of the various drawing file formats or CAD packages might allow the customer to detail the threads in each screw hole 20 (such as through a "hole wizard"), the customer may not be familiar with any particular "proper" method of detailing screw threads in the screw holes. Other drawing file formats or CAD packages have no mechanism to detail screw threads. In this example (as is common in practice), the customer has not provided any detail on the threads, but rather has merely drawn cylindrical screw holes 20 into the 3D CAD drawing file 10. The part 12 as drawn in the CAD file 10 thus does not itself detail whether none, one or all of the holes 20 will be eventually threaded.

While the designer understands the intended function of the rear enclosure 12 including how it is intended to mate with the cover, such understanding is often lost in translation in translation in seeking an internet-provided quotation for supplying the rear enclosure 12. In this particular example, the designer has merely drawn cylindrical screw holes 20 of 0.14 inches in diameter, believing such holes 20 looked to be about the right size for the intended use. The designer has drawn the cylindrical screw holes 20 to a depth of one half the depth of the rear enclosure 12, in this case a depth of 0.5 inches in a 1 inch deep enclosure. Even if the designer was using a CAD package that allowed detailing of thread profiles and even if the designer was intimately familiar with that CAD software, the designer still might not know what screw thread profile information to provide to enable a manufacturer to form the part 12 as desired.

Figure 4:
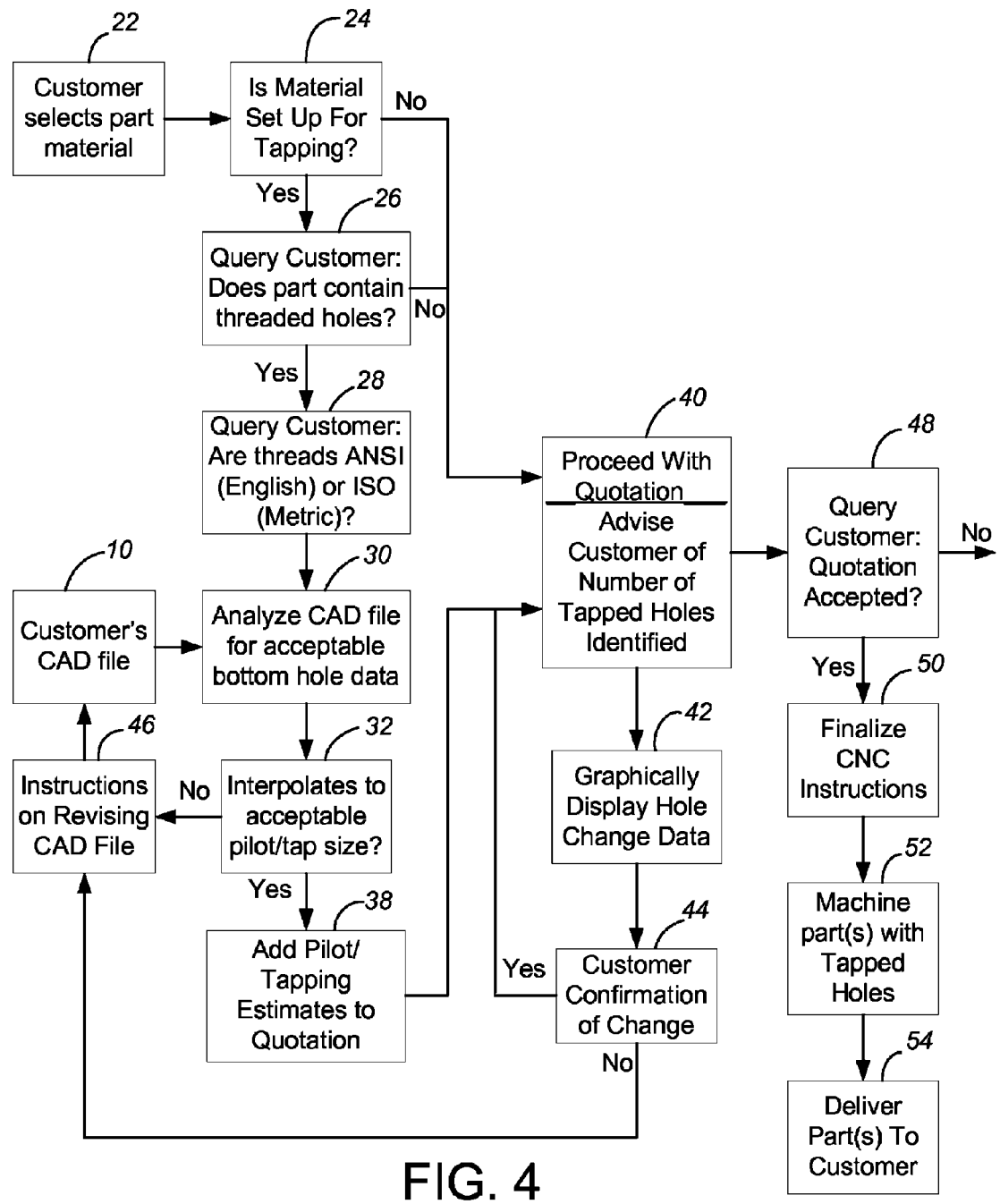
FIG. 4 is a flow chart of the preferred computer assisted thread determination subroutine.

A flow chart of the software system and method of the present invention to handle this example situation is shown in FIG. 4. In interacting with the customer, the customer selects 22 the material for the part 12, possibly from a menu of available materials provided over the internet from the manufacturer. Thus a first step in the preferred method is to make a determination 24 of whether the material selected by the customer is a material that the manufacturer has set up as being tappable using the manufacturer's procedures. For instance, the manufacturer may decide to only provide tapping for holes in metal parts, and not to provide tapping for holes in polymer parts, even though forming polymer parts without tapping may be available. Alternatively, the manufacturer may decide to only provide tapping for holes in soft metal parts such as aluminum, while not to provide tapping for holes in harder metal parts such as steel. As another alternative, the manufacturer may decide to provide tapping for holes in certain polymers that are not overly brittle and are sufficiently strong to receive screws.

Figure 5:
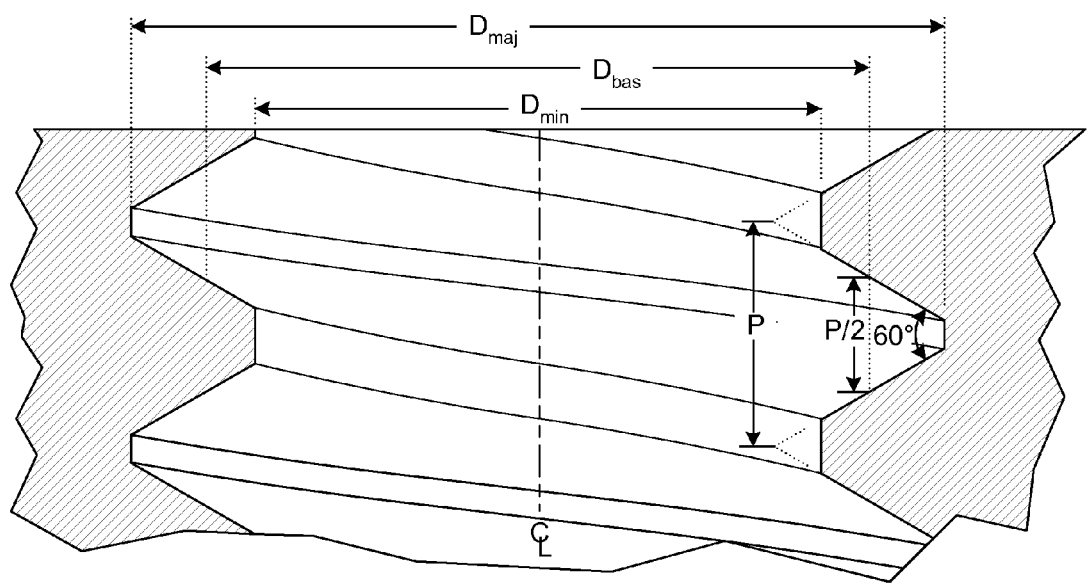
FIG. 5 is a cross-sectional view of an upper portion of a tapped hole, showing tap parameters.

In each case, part of the manufacturer's decision on what materials are set up as being tappable 24 is likely to depend upon the manufacturer's CNC mill set up. For instance, if the tappable materials are limited to aluminum, then the manufacturer might set up a 40-tool aluminum CNC mill (not shown) to cut threads. Tools slots 1-26 have a standard aluminum milling tool set. Tool slots 27-40 can be used for aluminum taps. In the United States, the tap set may include 7 ANSI and 7 ISO/metric taps, while a CNC mill located overseas may be set up solely for ISO/metric taps. In the preferred embodiment, seven preferred tap sizes are defined by ANSI standards as follows, with dimensions shown relative to the established thread profile in FIG. 5, and detailed below in TABLE 1 in inches:

TABLE I

ANSI STANDARD THREAD SIZES

| ANSI Threads | Minor Diameter $D_{min}$ | Basic Diameter $D_{bas}$ | Major Diameter $D_{maj}$ | Pitch P |
|---|---|---|---|---|
| #2-56 UNC 2B | 0.0667 | 0.0744 | 0.0860 | 0.0179 |
| #4-40 UNC 2B | 0.0849 | 0.0958 | 0.1120 | 0.0250 |
| #6-32 UNC 2B | 0.1042 | 0.1177 | 0.1380 | 0.0312 |
| #8-32 UNC 2B | 0.1302 | 0.1437 | 0.1640 | 0.0312 |
| #10-32 UNF 2B | 0.1562 | 0.1697 | 0.1900 | 0.0312 |
| ¼-20 UNC 2B | 0.1959 | 0.2175 | 0.250 | 0.0500 |
| ⅜-16 UNC 2B | 0.3073 | 0.3344 | 0.375 | 0.0625 |

The seven preferred tap sizes for ISO/metric threads are: M3, M4, M5, M6, M8, M10 and M12, each of which has a similarly specifically defined minor diameter, basic diameter, major diameter and pitch.

The particular tap sizes made available by the manufacturer maybe periodically revised or adjusted based upon popularity and based upon the number of tool spots available in the CNC mill. Other CNC mills may be set up to be dedicated with tools and taps for other materials. As another example, certain taps that permit bottom tapping maybe made available;

however, the preferred embodiment does not offer bottom tapping.

For materials that are set up as being tappable 24 in accordance with the preferred system, the customer is additionally queried 26 as to whether the part contains any threaded holes. The preferred quotation system adds a roadblock such as radio buttons: "My part has no tapped holes" and "My part has tapped holes".

If the part has tapped holes, then the customer may be additionally queried 28 as to whether the threads are ANSI (English) or ISO (metric). In the preferred system, the option for ANSI (English) threads is only available for designers requesting parts in the United States. If desired, a third alternative may be made available for customers who don't care whether the threads are ANSI (English) or ISO (metric), but rather merely want the closest available screw size to the holes 20 in the CAD model 10. All of these alternatives can be made available in the upload webpage for requesting a quotation of part manufacture.

If desired, for parts with tapped holes, the customer may be additionally required to check a checkbox (not shown) such as "I have read the Tapped Hole Fact Sheet". A Tapped Hole Fact Sheet is provided on another accessible webpage or panel that states the parameters and possibly the terms and conditions of tapping holes, such as the available thread sizes, hole sizes, materials and any other limitations for tapping.

One of the key parameters detailed on the preferred Tapped Hole Fact Sheet is to advise the customer which diameter will be used as the characteristic diameter for the tapped hole. In the preferred embodiment, the pilot hole size is the characteristic diameter. That is, cylindrical holes 20 defined in the CAD file 10 will be interpreted by the computer to represent the size intended for the pilot hole, with the tapping to occur at relatively larger diameters than the pilot hole. One of the benefits of using the pilot hole size as the characteristic diameter is that the SOLIDWORKS hole wizard will, by default, model the pilot hole. Other CAD package threading assistants may or may not model the pilot hole. Alternatively, the minor diameter of the threads, the basic diameter of the threads, or the major diameter of the threads would all be good candidates for representing the characteristic diameter of the tapped hole. Whatever diameter is selected to be the characteristic diameter for the tapped hole, the important aspect is that the designer understand what is intended. That is, when the designer shows a hole 20 in his or her CAD drawing 10, the designer should understand what the size of that hole represents, which, in the preferred embodiment, is the diameter and depth of the pilot hole that will be tapped.

When the CAD file 10 is uploaded by the customer to the manufacturer's website, a computer analysis of the CAD file 10 includes several additional steps for any parts having tapped holes. The first additional step is to analyze 30 the customer's CAD file 10 for acceptable bottom hole data. Using a program recorded as instructions on a computer readable medium, the manufacturer's computer processor looks for geometry features in the customer's CAD file 10 that represent the characteristic diameter, i.e., for geometry that could be a pilot for a tapped hole. In the preferred embodiment, this is a cylindrical hole of a suitable diameter and depth (possibly a through-hole) that can interpolate 32 to an acceptable pilot/tap size based upon the tool set made available by the manufacturer. In the preferred embodiment when the customer has selected ANSI/English threads, this acceptable pilot/tap size is defined size is defined to be within one of ranges as shown below in Table 2 and graphically shown with reference to FIGS. 6 and 8. The computer then selects 32 a desired thread size from a collection of available thread sizes based upon geometric characteristics (diameter and depth) of the qualifying cylindrical recess.

TABLE 2

ACCEPTABLE ANSI HOLE SIZE INTERPOLATION TABLE

| Minimum modeled pilot hole diameter | Maximum modeled pilot hole diameter | Maximum thread depth | Untapped depth at hole bottom | Acceptable Pilot Drill size | ANSI Threads |
|---|---|---|---|---|---|
| 0.050 | 0.078 | 0.438 | 0.071 | 0.067 | #2-56 UNC 2B |
| >0.078 | 0.097 | 0.562 | 0.100 | 0.089 | #4-40 UNC 2B |
| >0.097 | 0.120 | 0.688 | 0.125 | 0.1065 | #6-32 UNC 2B |
| >0.120 | 0.146 | 0.750 | 0.125 | 0.134 | #8-32 UNC 2B |
| >0.146 | 0.172 | 0.875 | 0.125 | 0.159 | #10-32 UNF 2B |
| 0.184 | 0.218 | 1.000 | 0.200 | 0.201 | ¼-20 UNC 2B |
| 0.295 | 0.334 | 1.250 | 0.250 | 0.3125 | ⅜-16 UNC 2B |

A similar table is developed for ISO/metric threads.

Figure 6:
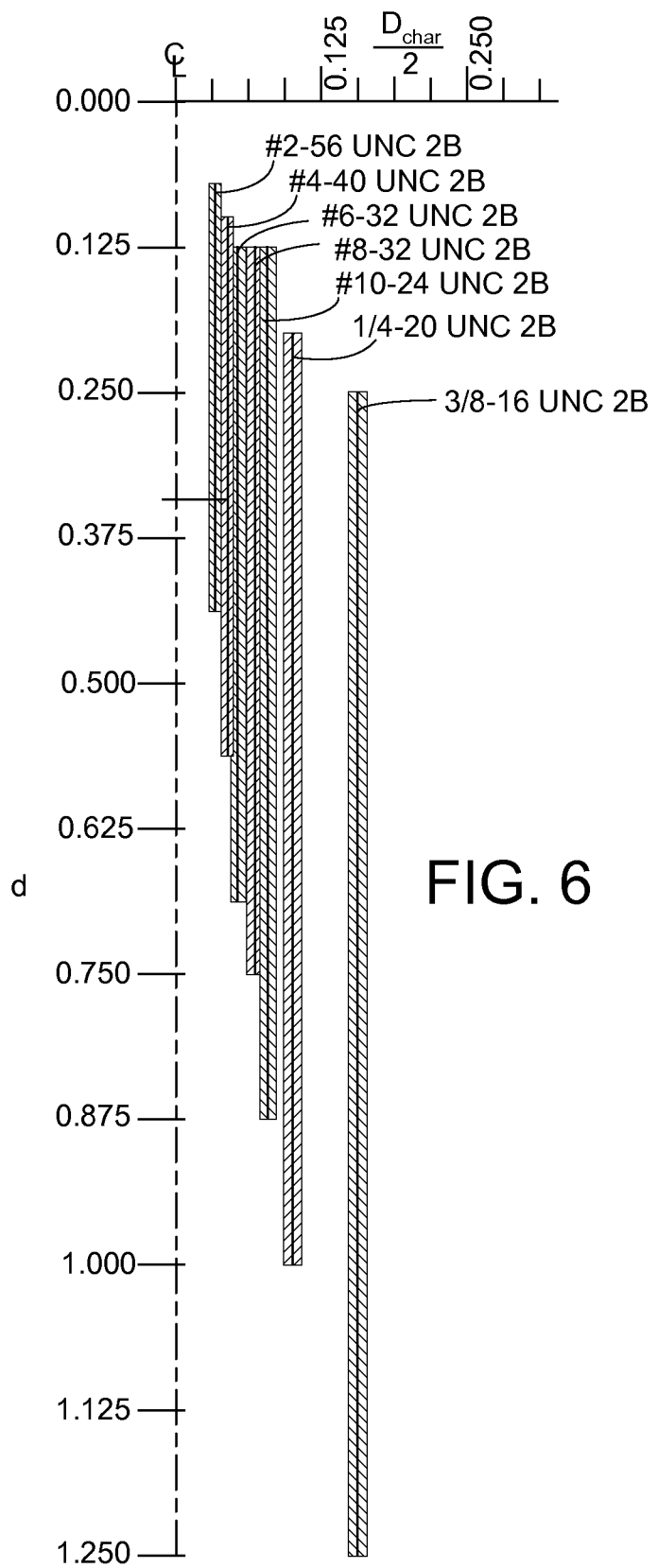
FIG. 6 is a graphical display of a preferred bottom hole range interpolation.

FIG. 6 shows the interpolation of Table 2 in a graphical format. By mapping the bottom thread depth and characteristic radius from the customer's CAD file onto the graph of FIG. 6, the graph shows which pilot hole size and thread size will result. Each line representing the pilot hole diameter and permissible thread depth is contained within a wider bar representing the characteristic diameters from the CAD model that will interpolate to that pilot hole diameter.

As shown in Table 2 and FIG. 6, the method and system of the present invention does not require the designer to select a particular thread profile or know the correct size or depth of the pilot hole 20 or any of the major, minor or basic diameter of the thread. Instead, the CAD file 10 is assessed with a computer to identify whether the shape includes one or more qualifying cylindrical recesses. For instance, whenever the designer's CAD file 10 has a hole of a diameter within the range of 0.050 inches to 0.078 inches and thread depth within the range of 0.071 inches to 0.509 inches, the preferred software system of the present invention will interpolate to #2-56 UNC 2B threads, and change the hole size proposed in the designer's CAD file (if necessary) to a 0.067 diameter size. In our specific example, the 0.140 inch hole size with a depth of 0.500 inches is acceptable relative to the #8-32 UNC 2B threads, requiring a change of the pilot hole diameter to 0.134 inches.

The preferred acceptable ANSI hole size interpolation table of Table 2 and graph of FIG. 6 shows several features that should be noted. First, holes having certain diameters are not qualified to be tapped. This includes holes having too small a diameter (smaller than 0.050 inches) or too large of a diameter (larger than 0.334 inches), as well as certain unqualified diameter ranges between the qualifying diameter ranges. For instance, holes having a diameter between 0.172 and 0.184 inches are not qualified to be tapped, nor are holes having a diameter between 0.218 and 0.295 inches. These unqualified diameter ranges are provided for several reasons. Not only does it reduce the number of taps required on the CNC mill, but the sizes left off are hole sizes that differ fairly dramatically from the most commonly available screws. If a CNC file 10 details a hole size within one of these unusual sizes, the software presumption is that the designer did not intend the hole to be tapped, but rather included the hole for a different purpose. At other (lower) diameter ranges within the acceptable ANSI hole size interpolation table and graph, the qualifying diameter ranges are contiguous. The software assumption here is that any hole of this approximate size, which covers the size of most small screw holes, is intended to be tapped; the computer assignment of the tap size interpolates to the closest provided tap out of the carried CNC toolset.

A separate feature of the preferred acceptable ANSI hole size interpolation table and graph is that the qualifying depth is dependent upon the diameter of the cylindrical recess. This feature primarily results from two considerations. Namely, the length of available mills and taps depends upon their diameter, with small diameter end mills and taps being shorter than larger diameter end mills and taps. The acceptable ANSI hole size interpolation table and graph only identifies holes having an appropriate thread depth that permits the tap to reach the bottom of the hole without the collet interfering with the top of the hole, and that provides sufficient thread length to hold a threaded fastener. At the same time, the preferred taps are not bottom hole taps to thereby reduce the torque required of the tap and permit the use of more common taps. The depth required at the bottom of the hole to form a complete thread is typically about four turns of the thread, and it is assumed that the designer wants at least four turns of completed thread. Thus the minimum depth of full threads and the partially tapped tapped depth at the bottom of the hole depends upon the pitch of the threads; larger pitched threads have an equivalently larger minimum thread length and equivalently larger untapped depth at the bottom of the hole.

Another feature of the preferred acceptable hole size interpolation tables/graphs is that some of the qualifying ANSI diameter range shown in Table 2 and FIG. 6 partially overlap with some of the qualifying metric diameter ranges. For instance, the preferred pilot hole for an M4 tap (3.6 mm, or 0.142 inches) falls within acceptable hole size diameter for #8-32 UNC 2B threads. Because a 0.142 inch hole falls within both a qualifying ANSI diameter range and a qualifying metric diameter range, the determination as to which tap to use is dependent upon the answer given by the customer to the ANSI (English) versus ISO (metric) query 28. Alternatively, if the customer hasn't decided between ANSI (English) versus ISO (metric) threads, then the size of the qualifying diameter ranges are adjusted smaller to interpolate between both ANSI (English) and ISO (metric) threads.

An additional feature of a preferred acceptable hole size interpolation graph is not reflected in Table 2 but is present in FIG. 6. Namely, the bar for #6-32 UNC 2B threads extends wider for deep holes, that is, for holes too deep to use a #4-40 UNC 2B thread. If sufficiently shallow to use either a #4-40 UNC 2B or a #6-32 UNC 2B thread, holes having a diameter up to 0.97 inches will be tapped with a #4-40 UNC 2B thread and holes larger than 0.97 inches will be tapped with a #6-32 UNC 2B thread. But if the presumed thread depth of the pilot hole on the CAD file is between 0.662 and 0.813 inches deep, then holes in the CAD file having a diameter down to 0.93 inches will be tapped with a #6-32 UNC 2B tap. FIG. 6 thus graphically shows that the mapping into an acceptable pilot/tap size need not be entirely rectangular and simple, but rather can use essentially any formula to represent which available pilot/tap size is most likely intended by the designer (even though the designer did not specify either the correct pilot diameter or the specific thread in the CAD file itself).

As best shown in Table 2, most of the preferred threads selected are UNC threads, i.e., coarse threads, while one of the preferred threads selected is a UNF thread, i.e., a fine thread. In general, UNF threads will use a larger pilot hole than a corresponding UNC thread, such as a #10-32 UNF 2B thread using a larger diameter pilot hole than a #10-24 UNC 2B thread. In the preferred embodiment, the manufacturer selects between providing UNC threads and threads and providing UNF threads based upon how common the relative use is in combination with providing a large range of coverage for interpolation of pilot holes. As one alternative, the manufacturer could include both UNC and UNF threads for the same major diameter, and query the customer as to whether the customer desires generally "coarse" threads or generally "fine" threads. Many customer may not know the specifics of the thread size desired, but may have a concept of whether they desire a generally "coarse" thread or a generally "fine" thread if fasteners are commonly available in either thread form to match or nearly match the modeled pilot hole diameter.

Finally, as shown in both Table 2 and FIG. 6, no adjustment is performed regarding the depth of the pilot hole. Rather than alter the depth of a pilot hole, a pilot hole that is too shallow or too deep to receive any available thread is simply not accepted for tapping. Alternatively, the analysis software could be programmed to also adjust the depth of the pilot hole on the CAD file to a depth acceptable for tapping.

The analysis 30 also considers orientation of each hole 20. The preferred CNC mill performs 3-axis milling from up to six orthogonal sides. The analysis therefore verifies that any tapped holes line up parallel to the cardinal axes, and also that the part geometry can be milled and tapped in the same orientation. On very large parts, tapped holes may be limited to the "Z" direction only.

Figure 7:
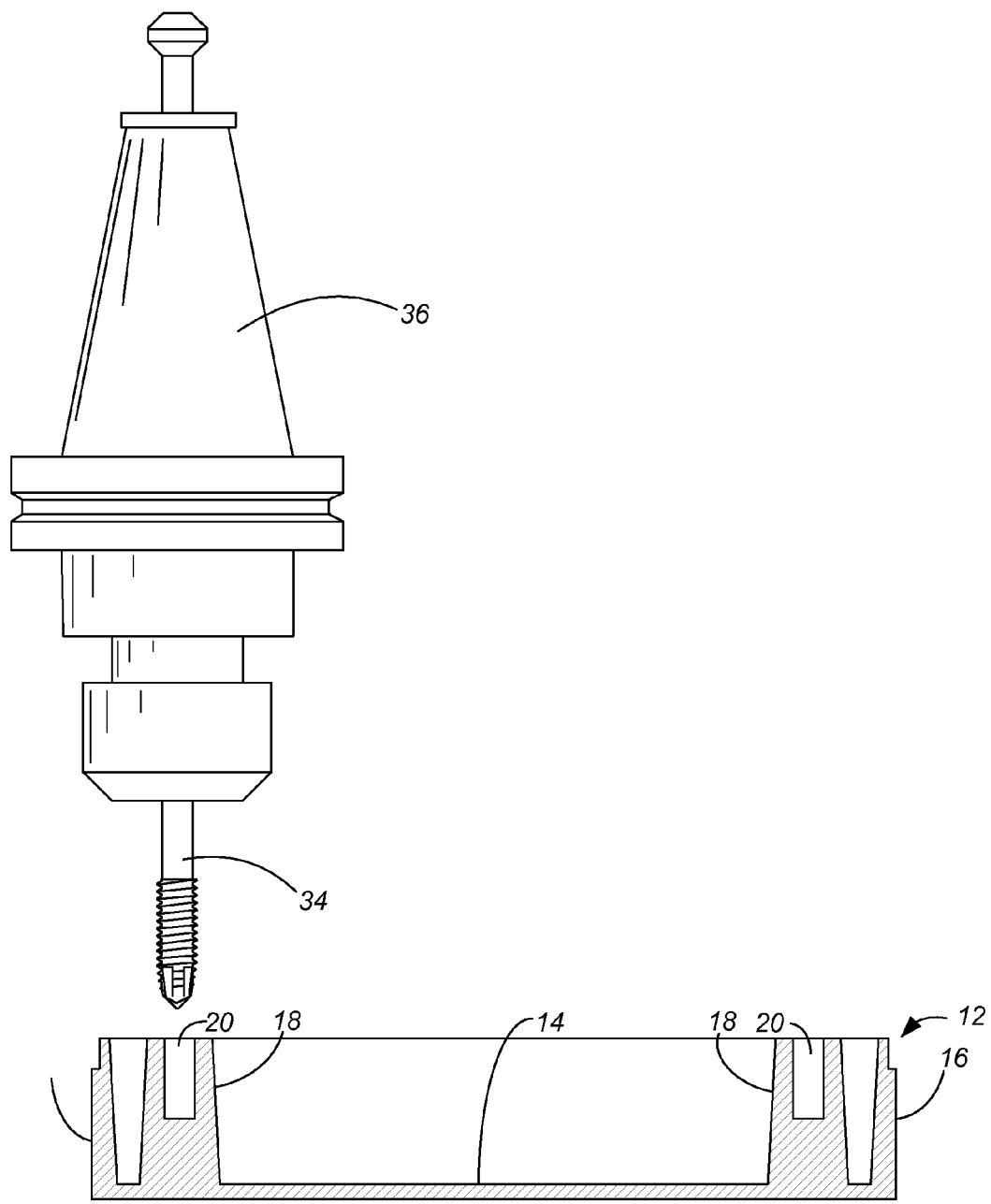
FIG. 7 depicts a tapping tool and CNC machine collet relative to a hole being tapped.

The analysis 30 considers access to each cylindrical recess and rejects holes that cannot be cut or tapped because they can't be reached, have collision issues, because the CNC fixtures interfere with a portion of the them, etc. For example, FIG. 7 shows a profile of a typical tap 34 and CNC collet 36 relative to the part 10. The software system of the present invention verifies that there is no interference with the collet 36 when the tap 34 is at the bottom of the hole. Holes that are obstructed by other features on the part or are obstructed by fixturing cannot be tapped and will be shown on the quote as untapped.

If desired, the analysis 30 may further consider whether the tap size is compatible with the overall size of the part 10. Larger taps sizes may be incompatible with smaller parts due to high torque requirements and the manufacturer's ability to reliably fixture the part. Another possibility is flagging or prohibiting automatic tap assignments to models with very large numbers of holes, e.g., a cribbage board.

Accordingly, based upon the customer's prior selections responsive to a few relatively simple queries 22, 26, 28, there is a unique possible thread for any characteristic diameter and depth of a candidate hole 20. This scheme is a general solution that works with any CAD file format. As a first result of the analysis 30, all holes 20 of suitable characteristic diameter, depth and accessibility are assumed to be tapped. If desired for certain types of CAD file formats that permit meta-data for specifying information about holes (such as in SOLID-WORKS), the analysis 30 can review any such meta-data to better predict which holes are intended to be tapped or not.

Once the acceptable pilot and tap sizes are identified 32, then the quotation being provided to the customer is adjusted 38 accordingly. For instance, a flat fee per tapped hole may be added to the quotation dollar value. With this adjustment 38 for tapped holes, the preferred system proceeds with the quotation analysis 40. If the customer indicated 26 that the design included tapped holes, then a status line by the price indicates the number of tapped holes that have been identified. The indication of the number of tapped holes provides a first confirmation by the customer of whether the tapping analysis 30 has correctly identified the holes that will be tapped.

Figure 8:
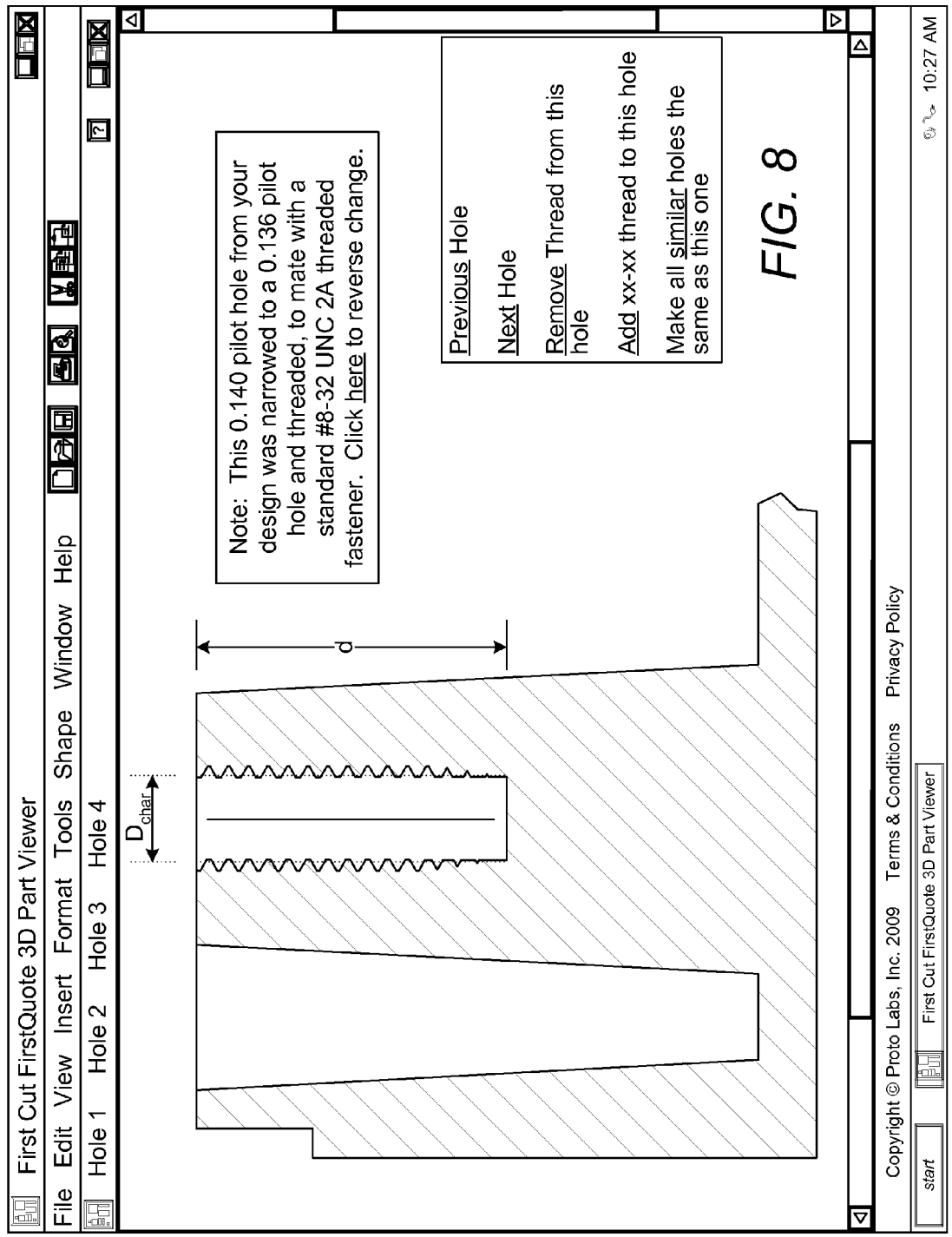
FIG. 8 is a representative screen shot graphically displaying hole change data.

A further confirmation 44 is provided by having a viewing tab on the quote that graphically displays 42 the hole change data provided by the interpolation 32. The hole change data is preferably under a tab such as "Tapped Holes", an example of which is shown in FIG. 8. The preferred basic view is a (possibly semi-transparent or cross-sectional) model with color-coded holes showing which thread style is assigned to each hole. This same view could be a page on the 3D-PDF. A color key would display the colors assigned to any thread size that has been placed on the model through the analysis 30. The designer is preferably able to step through each threaded hole in the model. Each display has a title such as "hole 1", "hole 2", etc. Selecting a hole link rotates the model to center the screw hole in the display and zooms the screw hole to a reasonable size. Possibly a cross-hair could be used to make sure the user is looking at the right screw hole.

Once the hole change data has been graphically shown to the designer, the designer is permitted to confirm 44 that the tap selected is appropriate. In the preferred embodiment as shown in FIG. 8, this confirmation is provided via a control panel (off the image but associated associated with it) that has the following options: "Previous Hole," "Next Hole," "Remove Thread from this hole," "Add xx-xx thread to this hole" [to un-do a removal], and "Make all similar holes the same as this one". Removing threads from holes immediately updates the quoted price interactively. If the thread assignments are not to a customer's liking and the customer cannot without assistance reassign the hole to an acceptable pilot/tap size, then the customer is preferably directed 46 to a page with information similar to the "Tapped Hole Fact Sheet" which provides the customer with instructions on revising the CAD file 10 to have tapped holes correctly assigned. The designer can then reupload the revised CAD file 10 to have the tapped holes again automatically analyzed 30 and appropriate taps assigned.

Following receipt of a quotation detailing the results of the tapped hole analysis 30 and having the dollar value of the quotation adjusted 38 for the tapped holes being proposed, the customer has the option of accepting 48 the quotation and ordering one or more parts in accordance with the quotation. Upon customer acceptance 48 of the quotation, the CNC instructions are finalized 50 as necessary to include the tapping instructions, and then applied 52 to a CNC mill to appropriately machine the proposed tapped holes into the workpiece. In the preferred embodiment, pilot holes are formed with an end mill having a side setup fixture. In many designs, it may be desirable to mill pilot holes and tap the holes before milling the remaining profile on that side of the part, to better hold the part in place under the torque of tapping. A through-hole may be tapped from either sides of the part. After the parts are formed 52 with the tapped holes, the part(s) 10 are delivered 54 to the customer.

Although the present invention has been described with reference to preferred embodiments, workers skilled in the art will recognize that changes may be made in form and detail without departing from the spirit and scope of the invention.

The invention claimed is:

1. A method of computer determination of CNC machining instructions, the method comprising:
    receiving a customer's CAD file, the CAD file generally defining a shape of a customer's part to be formed;
    assessing the CAD file with a computer to identify whether the shape includes one or more qualifying cylindrical recesses of the shape, including determining via computer whether the CAD file defines a cylindrical recess having a qualifying diameter, wherein a qualifying diameter is a diameter within a plurality of qualifying diameter ranges, wherein each different qualifying diameter range corresponds to a different tap size;
    for each identified qualifying cylindrical recess, computer selecting a thread size from a collection of available thread sizes based upon geometric characteristics of the qualifying cylindrical recess; and
    computer generating CNC machining instructions that include tapping the selected thread size into the shape.

2. The method of claim 1, wherein the assessing act comprises:
    questioning the customer via computer as to whether the part includes threaded holes.

3. The method of claim 2, wherein the customer is only questioned if the customer selects that the part is to be formed of one of a subset of materials out of all offered materials.

4. The method of claim 3, wherein the subset of materials is one or more metals, and wherein all offered materials comprises at least one polymer resin.

5. The method of claim 1, wherein each of the qualifying diameter ranges extends from a minimum modeled pilot hole diameter value to a maximum modeled pilot hole diameter value which is greater than the minimum modeled pilot hole diameter value.

6. The method of claim 1, wherein the plurality of qualifying diameter ranges comprises at least three separate, non-overlapping qualifying diameter ranges.

7. The method of claim 1, wherein unqualified diameters exist between two of the plurality of qualifying diameter ranges.

8. The method of claim 1, wherein at least two of the plurality of qualifying diameter ranges are contiguous.

9. The method of claim 1, wherein the assessing act comprises:
    determining via computer whether the CAD file defines a cylindrical recess having a qualifying depth.

10. The method of claim 9, wherein the qualifying depth is dependent upon the diameter of the cylindrical recess.

11. A method of computer determination of CNC machining instructions, the method comprising:
    receiving a customer's CAD file, the CAD file generally defining a shape of a customer's part to be formed;
    assessing the CAD file with a computer to identify whether the shape includes one or more qualifying cylindrical recesses of the shape;
    for each identified qualifying cylindrical recess, computer selecting a thread size from a collection of available thread sizes based upon geometric characteristics of the qualifying cylindrical recess, wherein the collection of available thread sizes comprises at least one available ANSI thread size and at least one available metric thread size;
    questioning the customer via computer as to whether threaded holes in the part are intended to be ANSI threads or metric threads; and
    computer generating CNC machining instructions that include tapping the selected thread size into the shape.

12. A method of computer determination of CNC machining instructions, the method comprising:
    receiving a customer's CAD file, the CAD file generally defining a shape of a customer's part to be formed;
    assessing the CAD file with a computer to identify whether the shape includes one or more qualifying cylindrical recesses of the shape, wherein the assessing act comprises determining via computer whether the CAD file defines a cylindrical recess having a qualifying diameter, wherein a qualifying diameter is a diameter within a plurality of qualifying diameter ranges including at least one qualifying ANSI diameter range and at least one qualifying metric diameter range which at least partially overlaps with the at least one qualifying ANSI diameter range, wherein each different qualifying ANSI diameter range corresponds to a different ANSI tap size and each different qualifying metric diameter range corresponds to a different metric tap size;
    for each identified qualifying cylindrical recess, computer selecting a thread size from a collection of available thread sizes based upon geometric characteristics of the qualifying cylindrical recess; and
    computer generating CNC machining instructions that include tapping the selected thread size into the shape.

13. A method of computer determination of CNC machining instructions, the method comprising:
    receiving a customer's CAD file, the CAD file generally defining a shape of a customer's part to be formed;
    assessing the CAD file with a computer to identify whether the shape includes one or more qualifying cylindrical recesses of the shape;
    for each identified qualifying cylindrical recess, computer selecting a thread size from a collection of available thread sizes based upon geometric characteristics of the qualifying cylindrical recess, wherein the selected thread size can have a different characteristic diameter from the diameter of the cylindrical recess specified in the CAD file;
    for selected thread sizes having a different characteristic diameter, automatically advising the customer of the selected thread size and different characteristic diameter; and
    computer generating CNC machining instructions that include tapping the selected thread size into the shape.

14. A method of computer determination of CNC machining instructions, the method comprising:
    receiving a customer's CAD file, the CAD file generally defining a shape of a customer's part to be formed;
    assessing the CAD file with a computer to identify whether the shape includes one or more qualifying cylindrical recesses of the shape;
    for each identified qualifying cylindrical recess, computer selecting a thread size from a collection of available thread sizes based upon geometric characteristics of the qualifying cylindrical recess;
    allowing the customer to confirm the selected thread size; and
    after the customer confirmation, computer generating CNC machining instructions that include tapping the selected and confirmed thread size into the shape.

15. A method of computer proposing modifications to a customer's part to correspond to common tap sizes of threaded holes that mate with commonly available threaded fasteners, the method comprising:

receiving a customer's CAD file, the CAD file generally defining a shape of a customer's part to be formed;

assessing the CAD file with a computer to identify whether the shape includes one or more qualifying cylindrical recesses of the shape;

for each identified qualifying cylindrical recess, computer selecting a common thread size from a collection of available common thread sizes based upon geometric characteristics of the qualifying cylindrical recess, each available common thread size corresponding to a common tap size of a threaded hole that mates with a commonly available threaded fastener, wherein the selected thread size can have a different characteristic diameter from the diameter of the cylindrical recess specified in the CAD file; and automatically advising the customer of the selected thread size and/or different characteristic diameter.

16. The method of claim 15, wherein the characteristic diameter is a diameter of a pilot hole for the threaded hole.

17. The method of claim 15, wherein the collection of available common thread sizes comprises at least one available ANSI thread size and at least one available metric thread size, and further comprising:

questioning the customer via computer as to whether threaded holes in the part are intended to be ANSI threads or metric threads, wherein the selected thread size, for at least some characteristic diameters, depends upon the customer's response.

18. The method of claim 15, further comprising:

adjusting a quotation for forming a part to include costs associated with tapping the threaded hole.

19. A computer program in a non-transitory computer readable medium, the computer program for proposing modifications to a customer's part to correspond to common tap sizes of threaded holes that mate with commonly available threaded fasteners, comprising:

computer instructions recorded on a non-transitory computer readable medium for assessing a CAD file to identify whether the shape defined by the CAD file includes one or more qualifying cylindrical recesses;

computer instructions recorded on a computer readable medium which, for each identified qualifying cylindrical recess, select a common thread size from a collection of available common thread sizes based upon geometric characteristics of the qualifying cylindrical recess, each available common thread size corresponding to a common tap size of a threaded hole that mates with a commonly available threaded fastener, wherein the selected thread size can have a different characteristic diameter from the diameter of the cylindrical recess specified in the CAD file; and computer instructions recorded on a computer readable medium that display the selected thread size and/or different characteristic diameter.

20. The computer program of claim 19, further comprising:

computer instructions recorded on a non-transitory computer readable medium that calculate a quotation for forming a part including costs associated with tapping the threaded hole at the selected thread size.

* * * * *

UNITED STATES PATENT AND TRADEMARK OFFICE
CERTIFICATE OF CORRECTION

| | |
|---|---|
| PATENT NO. | : 8,295,971 B2 |
| APPLICATION NO. | : 12/553088 |
| DATED | : October 23, 2012 |
| INVENTOR(S) | : Donald G. Krantz |

It is certified that error appears in the above-identified patent and that said Letters Patent is hereby corrected as shown below:

Title Page, item (57); in the Abstract, line 8, delete "advised 10" and insert therefore --advised--.

At Column 4, lines 59-60, delete "in translation in translation" and insert therefore --in translation--.

At Column 6, line 62, delete "size is defined size is defined" and insert therefore --size is defined--.

At Column 8, line 35, delete "tapped tapped" and insert therefore --tapped--.

At Column 9, line 12, delete "threads and threads and" and insert therefore --threads and--.

At Column 10, line 34, delete "associated associated" and inserted therefore --associated--.

Signed and Sealed this
First Day of January, 2013

David J. Kappos
*Director of the United States Patent and Trademark Office*